United States Patent [19]

Johnson et al.

[11] Patent Number: 5,056,107
[45] Date of Patent: Oct. 8, 1991

[54] RADIO COMMUNICATION NETWORK FOR REMOTE DATA GENERATING STATIONS

[75] Inventors: Dennis F. Johnson; Michael Wiebe, both of Winnipeg, Canada

[73] Assignee: Iris Systems Inc., Winnepeg, Canada

[21] Appl. No.: 480,573

[22] Filed: Feb. 15, 1990

[51] Int. Cl.$^5$ .................. H04K 1/00; H04B 15/00; G08C 17/00
[52] U.S. Cl. ................... 375/1; 340/870.03; 340/870.06; 340/870.11; 340/870.28; 340/637; 324/110
[58] Field of Search ............ 340/870.03, 870.06, 340/870.11, 870.28, 551, 552, 637; 379/106; 324/110

[56] References Cited

U.S. PATENT DOCUMENTS 4,361,851 11/1982 Asip et al. .................. 379/106 X
4,799,059 1/1989 Grindahl et al. ............... 340/870.03

OTHER PUBLICATIONS

*Spread Spectrum Systems*, by R. C. Dixoni (John Wiley & Sons, Inc., 1984); Section 2.3, pp. 42–44.
Andrew S. Tanenbaum, Computer Networks, "Satellite Packet Broadcasting", Prentice Hall, 1981, pp. 253–257.
Databeam, "System Schematic", Jul. 1986.

*Primary Examiner*—Bernarr E. Gregory
*Attorney, Agent, or Firm*—David B. Newman, Jr. & Associates

[57] ABSTRACT

A radio communications network for transmitting data from a plurality of remote stations to a central station is provided. This system is particularly proposed for automatic meter reading systems in which the remote stations are located at utility meters. The system includes an array of receiving stations arranged relative to the remote stations so that the mesages from each remote station can be received by at least two and preferably four of the receiving stations providing a high level of duplication of messages. The remote stations transmit utility usage information obtained from the previous time period at a random time subsequent to the time period so that message collisions can occur. High level of duplication provided by the increased number of receiving stations reduces the message loss. A quiet period during which the remote stations are prevented from transmitting can be used for communication between the receiving stations and the central station.

19 Claims, 4 Drawing Sheets

RADIO COMMUNICATION NETWORK FOR REMOTE DATA GENERATING STATIONS

BACKGROUND OF THE INVENTION

This invention relates to a radio communication network for communicating data from a plurality of remote data generating stations to a central station where the data is collated and analyzed.

Devices of this type are particularly but not exclusively useful in communicating from remote meter reading devices of a utility metering system. The present invention will be described in relation to a remote or automatic meter reading system, however it will be appreciated that alternative uses of the network are possible. The device of the present invention may however be used advantageously in many other remote metering or monitoring systems in which its is necessary for a large number of remote stations to communicate to a central station, for example, burglar alarm systems or industrial process monitoring systems.

Many attempts have been made in recent years to develop an automatic meter reading system for utility meters which avoids the necessity for meter reading personnel to inspect the meter and to physically note the meter readings. There are of course many reasons for attempting to develop a system of this type which will not be expanded at length here.

However most of these systems have achieved little success. The system which has achieved most success or is most widely used is a system in which the automatic meter reading unit is mounted on an existing meter at the usage site and includes a relatively small transmitter and receiver unit of very short range. The unit is then polled on a regular basis by a travelling reading unit which is in practical terms carried around the various locations on a suitable vehicle and operated to roll each automatic meter reading unit in turn to obtain the stored data. This device is of course of only very limited value in that it is still necessary to transport the equipment around the various locations and hence only very infrequent, for example monthly, readings can be made. Basically this system only avoids the necessity of the meter reader actually entering the premises to physically inspect the meter which is of itself of some value but only limited value.

Alternative proposals in which reading from a central location is carried out have been made but have achieved little success. One proposal involves an arrangement in which communication is carried out using the power transmission line of the electrical utility. Communication is therefore carried out along the line and rolls each remote reading unit in turn. This device has encountered significant technical difficulties.

Other alternatives have attempted to use the pre-existing telephone lines for communication but this proposal has the significant disadvantage that it must involve a number of other parties, in particular the telephone company, in the implementation of the system and there is a significant reluctance by the utility companies to become involved in a system which cannot be entirely controlled and managed by themselves.

A yet further system using radio communication has been developed by Data Beam which was a subsidiary of Connecticut Natural Gas. This arrangement was developed approximately in 1986 and has subsequently received little attention and it is believed that no installations are presently operative.

In this arrangement the system includes a meter reading device mounted upon the meter concerned together with a transmitting antenna which is separate from the meter reading device and located on the building or other part of the installation site which enables the antenna to transmit over a relatively large distance The system is further provided with a number of receiving units with each arranged to receive data from a large number of transmitters stated to lie in the range 10,000 to 30,000. It is believed that the transmitters in order to achieve maximum range were intended to be positioned to some extent directionally or at least on a suitable position of the building to transmit to the intended receiving station. This arrangement leads to the use of a minimum number of receiving stations which it is believed was assumed to be the optimum technique for cost efficiency.

However the separate transmitter antenna generated significant installation problems in view of the necessity to wire the device through the building to a suitable location. In addition the high level of power used in transmission involved very expensive battery systems or very expensive mains wiring. The proposal to reduce this excessive cost was to use the transmission unit for a number of the different utilities used in the building so that the cost of the transmitter could be spread for example between three utilities supplied to the building. However this has the problem that it is necessary for the separate utility companies to cooperate in the installation. While this might therefore be highly desirable it is difficult to achieve on a practical basis.

In order to avoid timing problems, the meter reading units were arranged to communicate on a pseudorandom time basis. However the very large number of meter reading units reporting to a single receiving station, up to 30,000, leads to a very high number of possible collisions between the pseudorandomly transmitted signals. The system therefore as proposed, with daily or more often reporting signals could lose as many as 20% to 50% of the signals transmitted due to collisions or interference which leads of course to a very low efficiency of data communication.

Furthermore, the use of transmitters at the meter reading units which are of maximum power leads to the necessity for a larger interference protection radius between systems using the same allocated frequency.

An alternative radio transmission network is known as ALOHA. In this system a number of broadcasting stations communicate with a single receiving station with the broadcasting stations transmitting at pseudorandom intervals. In this system therefore again, collisions will occur so that messages will be lost. The solution for this problem in the ALOHA system is for each of the broadcasting stations to monitor the retransmission of the information from the receiving station so that each broadcasting station is aware when its transmission has been lost. It is then programmed to retransmit the lost information after a predetermined generally pseudorandom period of time. However this system requires retransmission of the information from the receiving station to take place substantially immediately and requires each broadcasting station to also have a receiving capability. Cellular telephone networks have recently become implemented on a wide scale. These systems however use and allocate different frequencies to different remote stations. While this is acceptable in a high cost field of telecommunications, the costs and complications cannot be accepted in the relatively lower margin use of remote station monitoring. The technology of cellular telephones however leads to the perception in the art that devices of this type must use different frequency networks.

While theoretically automatic meter reading is highly desirable, it is of course highly price sensitive and hence it is most important for any system to be adopted for the price per unit of particularly the large number of meter reading units to be kept to a minimum. The high cost of high power transmission devices, receiving devices and battery systems generally leads to a per unit cost which is unacceptably high.

SUMMARY OF THE INVENTION

It is one object of the present invention, therefore, to provide an improved radio communication network for transmitting data from a plurality of separate remote stations which is simple and economic to install.

It is a second object of the invention to provide an improved communication network which is particularly suitable for an automatic meter reading system and can lead to a reduced cost per unit for the meter reading units.

It is a further object of the present invention to provide a meter reading unit suitable for use in the radio communication network.

According to a first aspect of the invention there is provided a radio communication network for communicating information comprising a plurality of remote data generating stations, each of the remote stations having means for generating data for transmission, control means for modulating the data for transmission on a radio frequency carrier and arranged to form said data into a packet of data and to transmit said data at a time period which is substantially pseudorandomly selected within a predetermined time period, and an antenna for transmitting multi-directionally the carrier, the radio frequency carrier being the same for each of said remote stations, a central station for receiving and storing the data, and a plurality of receiving stations each including means for receiving the data and means for subsequently retransmitting the data to the central station, the receiving stations being arranged in an array relative to the remote stations such that each receiving station can receive data from a plurality of said remote stations and such that the data transmitted by substantially each one of said remote stations can be received by at least a respective two of said receiving stations to generate duplicate packets of the data at least one of which is redundant, the central station including means for receiving the data from each of said receiving stations, that being provided means for identifying and collating the data from each of said remote stations arranged such that only one of the duplicate packets is collated.

According to a second aspect of the invention there is provided an apparatus for detecting usage of a utility and for transmitting data relating to the usage comprising a support structure for mounting at a location of use of the utility, means on the support structure for detecting use of the utility, means for calculating and storing a value of accumulated usage during a predetermined mined time period, control means for modulating the value for transmission on a radio frequency carrier and arranged to form said value into a packet of data and to transmit said data at a specific time subsequent to said predetermined time period which is substantially pseudorandomly selected and an antenna mounted on said support structure for transmitting multi-directionally the carrier.

The present invention therefore employs transmitters at the remote stations which employ a much lower power with of course the necessity for more receiving stations. Other things being equal, this approach has fewer packets of data being received by each receiving station so that packet collision probabilities are lower, improving network performance and providing greater flexibility.

While the Data Beam system necessarily has some level of overlap between receiving stations to ensure that all meter reading units are received, the present invention uses overlap and the resultant duplication of transmission to significantly reduce the number of data packets lost by virtue of collisions.

The significant reduction in the number of collisions is obtained by the fact that the collision will be prevented at some of the receiving stations by the fact that the signal strength at that receiving station is significantly greater for one of the signals than for the other. Thus if signals are simultaneously transmitted from two remote stations, it is most likely that one of those remote stations will be significantly closer to a receiving station than the other of the remote stations. Similarly the other of the remote stations will be significantly closer to a receiving station than the first remote station. Thus it is most likely that neither of the signals will be lost because both signals will be picked up by different receiving stations.

It is known that the attenuation of the signal is proportional to the inverse of the distance from the source to the power N. In free space N is equal to 2. In more practical examples where buildings, trees and other geographical obstructions interfere with the signal N generally lies between 4.0 and 5.0. This effect therefor significantly reduces the distance over which the signal from the remote station can be monitored, that is it significantly reduces the number of remote stations which can be monitored by a single receiving station. Furthermore, the large N rapidly reduces the signal strength after a predetermined distance so that while a remote station can be affectively monitored at a certain distance, the signal strength rapidly falls off beyond that distance. This enables the cells defined by each receiving station to be relatively specific in size and for the degree of overlap of the cells to be controlled to practical levels without wide statistical variations.

A further advantage of the present system is that remote stations which are located at a position which is geographically very disadvantageous for transmission to the closest receiving station may be monitored by a different one of the receiving stations. Thus, in conventional systems some of the remote stations may not be monitored at all in view of some particular geographical problem. In the present invention this possibility is significantly reduced by the fact that the remote station concerned is likely to be in a position to be monitored by a larger number of the receiving stations so that the geographical problem most probably will not apply to all of the receiving stations.

The increased density of receiving stations permits the remote stations to operate with an integral antenna which can be formed as part of the meter reading unit housed within the conventional electric utility meter. In this way the remote station can be totally self contained within the meter housing thus allowing installation within a very short period of time, avoiding customer dissatisfaction caused by wiring problems and reducing the possibility of damage to a separately mounted antenna. In addition this arrangement significantly reduces the cost of the remote station to a level which is economically viable to allow installation of the system.

The present invention can employ a system in which the remote stations are permitted to transmit only during a predetermined time period so that an open time period is available for communication on the same frequency between the central station and the receiving station without any interference from the remote stations. This level of communication can be carried out using a polling system from the central station to each of the receiving stations in turn preferably including a directional transmission system at the central station. This system allows optimization of the receiving station density to meet cost/performance criteria in different deployment scenarios.

The present invention, therefore, by recognizing the non-volatile nature of the information source and the acceptability of missing an occasional update through transmission errors or collisions enables the implementation of data collection networks of greater simplicity and at lower cost than is possible with established communication network approaches involving two-way communication. The present invention therefore provides a radio communication network which can be employed to acquire data from a large number of remote meter monitoring devices disposed over a wide area using very low power transmitters in conjunction with an array of receiving stations all operating on a single radio communication channel or frequency.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Reference is made to corresponding U.S. application no. 429,458 filed Oct. 31, 1989 which contains disclosure of some details of the meter reading unit which are repeated here for completeness.

Figure 1:
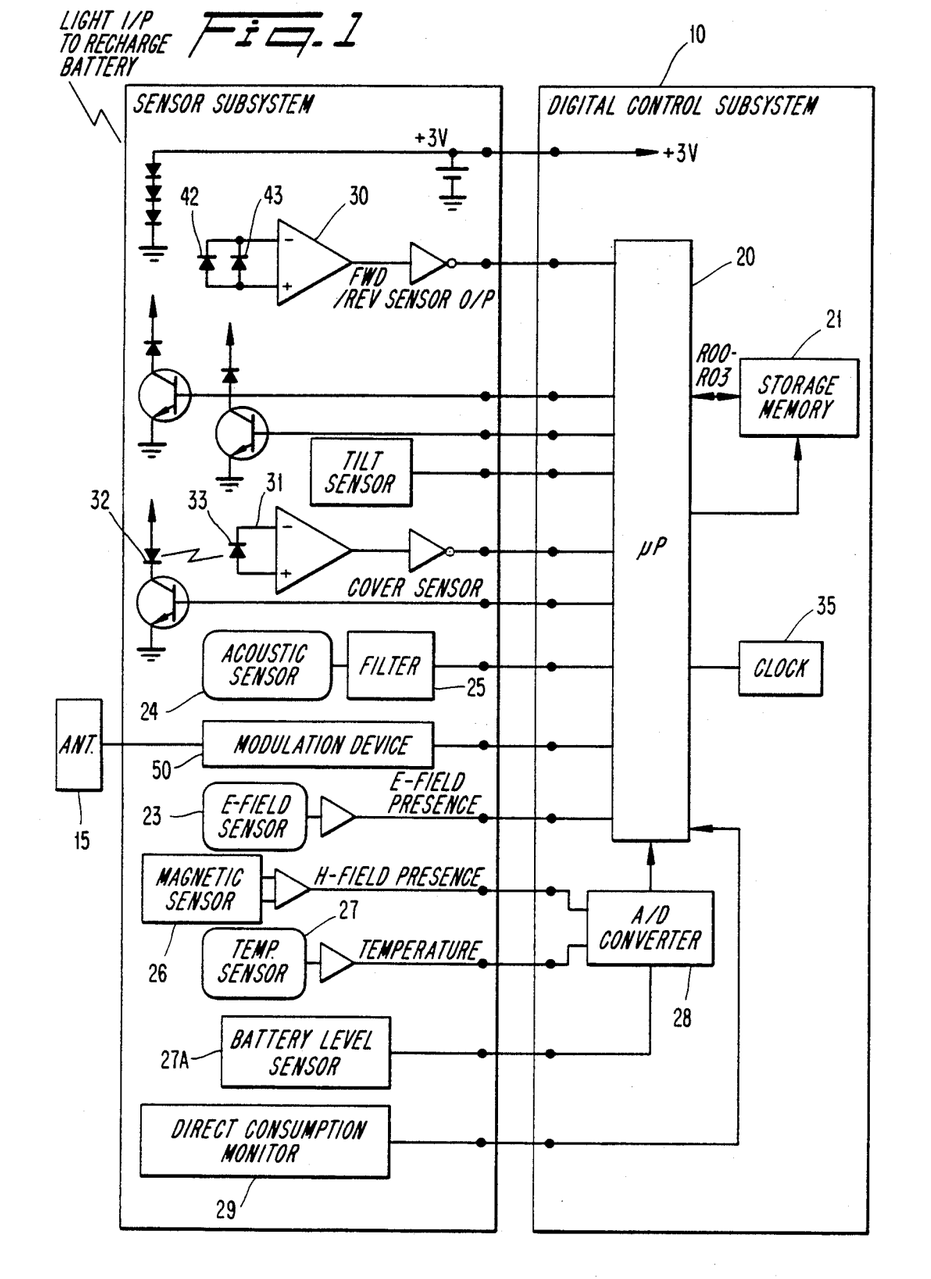
FIG. 1 is a schematic illustration of the remote meter reading unit according to the present invention.
Figure 2:
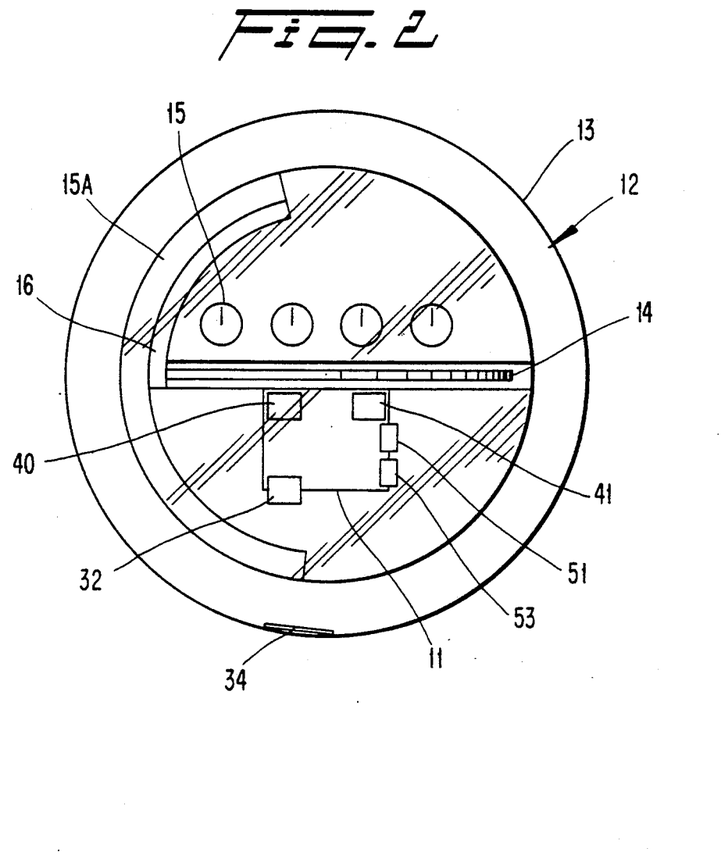
FIG. 2 is a front elevational view of a conventional electricity meter with the detection unit of the present invention installed.
Figure 3:
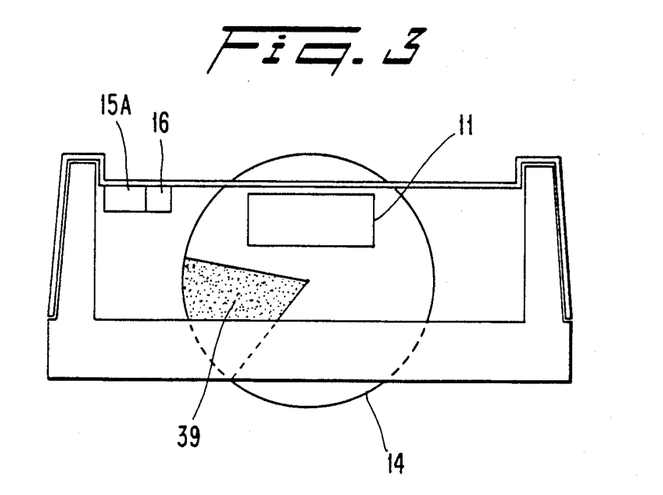
FIG. 3 is a bottom plan view of the electricity meter of FIG. 2.

The detection unit is schematically indicated at 10 in FIG. 1 and this is mounted in a suitable housing shown at 11 in FIG. 2 with the housing including suitable mounting arrangement for attachment of the housing into the interior of a conventional electricity meter 12.

The meter 12 includes an outer casing 13 which is generally transparent. Within the casing is provided the meter system which includes a disk 14 which rotates about a vertical axis and is driven at a rate dependent upon the current drawn to the facility. The numbers of turns of the disk 14 are counted by a counting system including mechanical dials 15. As the meter is of conventional construction and various different designs are well known, no further detail will be given here.

The housing 11 is a sealed housing which prevents tampering with the sensors, microprocessor and memory systems located within the housing.

An antenna 15A is mounted on a bracket 16 carried on the housing inside the casing 13. The antenna as shown is arc-shaped extending around the periphery of the front face. Other antenna configuration are possible.

Turning now to FIG. 1, the detection device 10 comprises a microprocessor 20 which has associated therewith a storage memory 21.

A number of sensors are provided for detection of tampering events. These sensors are as follows:

(a) A tilt sensor 22 is provided to detect movement of the housing through an angle greater than a predetermined angle so that once the device is installed indication can be made if the device is removed or if the meter is removed from its normal orientation.

(b) A sensor 23 is provided which detects the presence of an electric field. Provided there is no power failure, the electric field sensor should continue to detect the presence of an electric field unless the meter is removed from the system.

(c) An acoustic sensor 24 is provided which detects sounds. The sounds detected are transmitted through a filter 25 which is arranged to filter by analog or digital techniques the sound signal so as to allow to pass through only those sounds which have been determined by previous experimentation to relate to cutting or drilling action particularly on the cover.

(d) A sensor 26 is provided which detects the presence of a magnetic field. A magnetic field is generated by the coils driving the disk 14 so that magnetic fields should always be present unless the meter has been by-passed or removed. As is well known, the rate of rotation of the disk is dependent upon the magnetic field and therefore this rate of rotation can be varied by changing the magnetic field by applying a permanent or electromagnet in the area of the meter to vary the magnetic field. The sensor 26 is therefore responsive to variations in the magnetic field greater than a predetermined amount so as to indicate that an attempt has been made to vary the magnetic field adjacent the disk to slow down the rotation of the disk.

(e) A sensor 27 is provided which detects temperature so that the temperature associated with a particular time period can be recorded.

A battery status sensor is indicated at 27A.

The sensors 26, 27 and 27A communicate through analog digital converter indicated at 28 for transmission of the information to the microprocessor.

The information from sensors 27 and 27A can be communicated to provide "housekeeping" status of the operation of the unit.

The sensor 27 relating to the temperature can be omitted if required and this information replaced by information gained from a public weather information source. In some cases the meter is located inside the building and hence the temperature will remain substantially constant whereas the outside temperature is well known to vary consumption quite dramatically.

(f) A further sensor 29 comprises a direct consumption monitor which can be of a very simple construction since it is not intended to act as an accurate measure of the consumption of the electricity used. The direct consumption monitor can therefore simply be a device which detects the value of the magnetic field generated on the assumption this is proportional to the current drawn. The direct consumption value obtained can then be compared with a measurement of the consumption as recorded by the rotation of the disk 11. In the event that the direct consumption monitor provides a sum of the consumption over a time period which is different from the consumption measured by rotation of the disk 11 by an amount greater than a predetermined proportion then the direct consumption monitor can be used to provide a tamper signal. This would be indicative for example of a mechanical tag applied to the disk to reduce recorded consumption.

(g) A further sensor generally indicated at 30 (discussed in more detail hereinafter) detects reverse rotation of the disk 11 and provides an input to the microprocessor on detection of such an event.

(h) A further sensor generally indicated at 31 is used to detect the continual presence of the cover 13. The cover sensor comprises a light emitting diode 32 which generates a light beam which is then reflected to a photo diode 33. The absence of the reflected beam at the photo diode 33 is detected and transmitted as a tamper signal to the microprocessor. The reflected beam is generated by a reflective strip 34 applied on the inside surface of the cover adjacent the diode 32 as shown in FIG. 2.

The above sensors thus act to detect various tampering events so that the presence of such a tampering event can be recorded in the memory 21 under control of the microprocessor 20.

The microprocessor includes also a clock signal generator 35 so the microprocessor can create a plurality of time periods arranged sequentially and each of a predetermined length. In the example of the present invention shown the time periods are eight hours in length and the microprocessor is arranged to record in each eight hour period the presence of a tamper event from one or more of the tamper signals.

Figure 4:
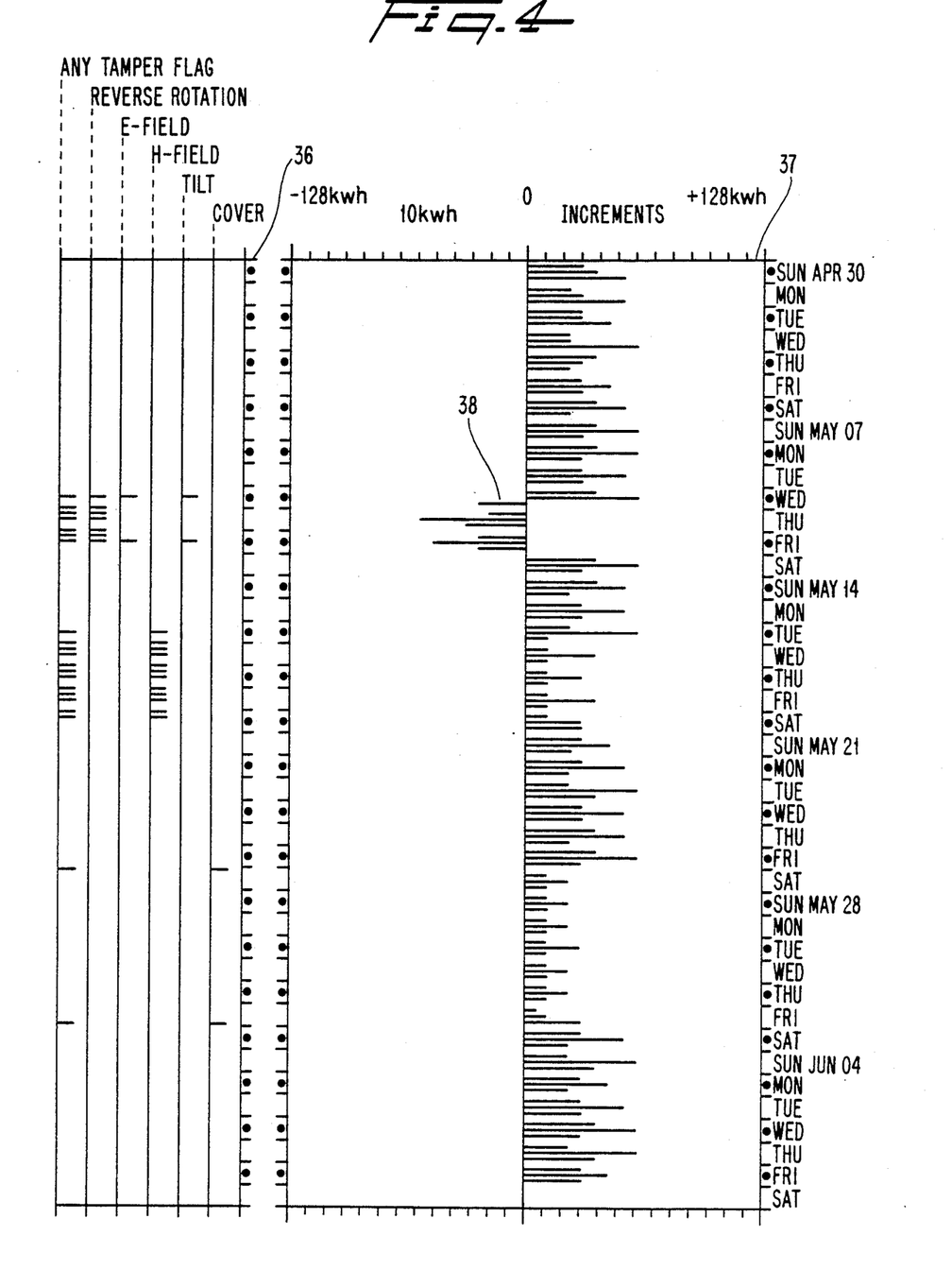
FIG. 4 is an illustration of a typical printout from the information obtained by the remote reading unit of FIG. 1.

As shown in FIG. 4 the series of the predetermined time periods is recorded with the series allocated against specific dates and each eight hour period within the day concerned having a separate recording location within the memory 21. One such series is shown in FIG. 1 where a number of tampering events are indicated generally shown at 36. The print-out thus indicates when any tampering event has occurred and in addition then identifies which type of tampering event has taken place.

The rotation of the disk 11 is also detected to accurately record the number of rotations of the disk both in a forward and in a reverse direction. In FIG. 4 there is indicated at 37 a table showing in graphic form the amount of rotation of a disk recorded in eight hour periods as previously described. It is shown that for one period of time the disk rotates in a reverse direction as shown at 38 and of course it will be appreciated that. Whenever the disk rotates in a reverse direction this reverse rotation subtracts from the number of turns counted on the conventional recording system 15.

The detection of the rotation of the disk is carried out by the provision of a dark segment 39 formed on the undersurface of the disk leaving the remainder of the disk as a reflective or white material. The detection system thus provides a pair of light emitting diodes 40 and 41 Which are positioned on the housing so as to direct light onto the underside of the disk. The diodes 40 and 41 are angularly spaced around the disk. The diodes are associated with photo diodes 42 and 43 which receive light when the disk is positioned so that the light from the associated diode 40 or 41 falls upon the reflective part of the disk and that light is cut off when the dark part of the disk reaches the requisite location. Basically therefore one of the pairs of light emitting diodes and photo diodes is used to detect the passage of the dark segment that is of course one rotation of the disk. The direction of rotation is then detected by checking with the other of the pairs as the dark segment reaches the first of the pairs as to whether the second pair is also seeing the dark segment or whether it is seeing the reflective part. Provided the sensors are properly spaced in relation to the dimension of the segment therefore this will indicate the direction which the disk rotated to reach the position which is detected by the first pair of diodes.

In order to conserve energy, the sensors are primarily in a sampling mode using an adaptive sensing rate algorithm. In one example the dark or non-reflective segment is 108° of arc and there is provided a 50° displacement between the sensors. In a practical example of conventional meter, the maximum rotation rate is of the order of 2 rps. A basic sample interval can be selected at 125 m/sec, short enough to ensure at least one dark sample will be obtained from the dark segment. In operation, only the first pair of sensors is sampled continuously. When a dark response is observed, second confirming sample will be obtained and the sample rate will be increased to 16 pps. As soon a light segment of the disk is sensed, the second sensor is sampled. The second sensor still sees the dark segment then cw rotation is confirmed while if a light segment is observed then ccw rotation is indicated.

At slower speeds, the algorithm will result in a sample rate of 8 pps for 70% of a rotation and 16 pps for 30% of a rotation for the first pair of sensors plus two samples for direction sensing for the second pair. For an annual average consumption of 12,000 kwh, the disk rotates approximately 1.6 million times.

In order to sense this presence of stray light which could interfere with measurements, the photo diode output will be sampled immediately before and immediately after the LED is activated. If light is sensed with the LED off, stray light is indicated an alarm may be initiated after confirming test The latter may include a test of other sensors such as the optical communication port sensor discussed hereinafter.

As shown in FIG. 1 Communication from the meter reading unit is carried out by radio transmission from the microprocessor 20 through a modulation device 50 which connects to the antenna 15. The transmission of the signal is carried under control of the microprocessor as discussed hereinafter. Modulation carried out by the modulation device 50 can be of a suitable type including for example spread spectrum modulation in which the signals are modulated onto a number of separate frequencies at timed intervals so that no single frequency channel is used. This allows the system to be used without the allocation of a dedicated frequency so that the signal appears merely as noise to receivers which do not have access to the decoding algorithm by which the signal can be recovered from the different frequencies on which it is transmitted.

Figure 5:
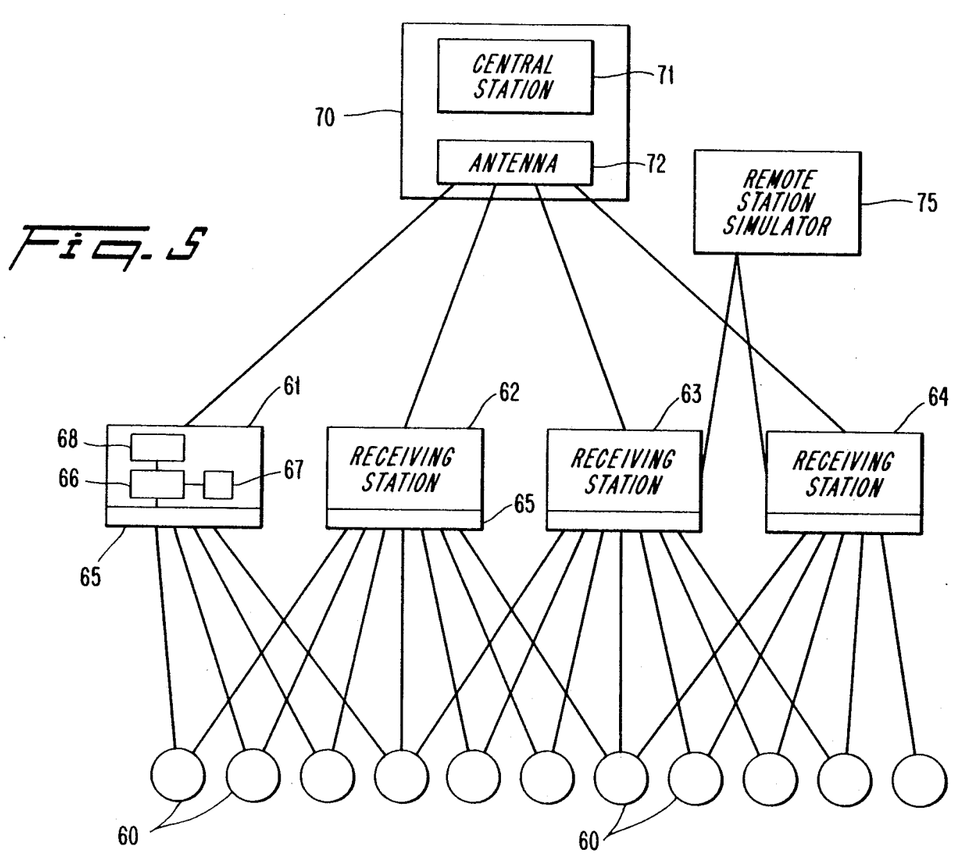
FIG. 5 is a schematic illustration of a radio communications network according to the present invention.

Turning now to FIG. 5, a plurality of the remote meter reading units are indicated at 60. It will be appreciated that the remote stations are set out in a pattern across the ground which is dependent upon the positions of the utility usage which generally does not have any particular pattern and the density will vary significantly for different locations. In the drawing the remote stations are schematically indicated simply by the array of bodies indicated at 60.

A plurality of receiving stations is provided as indicated at 61, 62, 63 and 64. Each remote receiving station includes an omni-directional antenna 65, a demodulation device 66, a memory 67 and a microprocessor control 68.

The receiving stations are arranged in an array relative to the remote stations with the spacing between the receiving stations being arranged relative to the remote stations so that each remote station can transmit to at least two and preferably four of the receiving stations. Thus it will be appreciated that the receiving stations are provided in significantly larger numbers than is absolutely necessary for each remote station to be received by a respective one of the receiving stations. Thus the receiving stations theoretically receive high levels of duplicate information.

The antenna of each of the remote stations is as previously stated mounted within the housing of the meter that is it is mounted on the support structure itself of the remote station. This enables the unit to be manufactured relatively cheaply as an integral device which can be installed simply in one action. However, this provides an antenna which can transmit only relatively short distances. In addition the power level is maintained in relatively low value of the order of 10-100 mw watts, the energy for which can be provided by a smaller battery system which is relatively inexpensive. An antenna of this type transmitting at the above power level would have a range of the order of one to two kilometers. In a normal residential situation, the location of the receiving stations so that each remote station can be received by four such receiving stations would lead to an array in which each receiving station would be responsive to approximately 1,000 of the remote stations.

Turning again to the remote meter reading stations, each of these stations is arranged to calculate an accumulated value of utility usage for a set period of time which in the example shown is eight hours. Subsequent to the eight hour period, the microprocessor prepares to transmit the information in a packet of data. This packet of data includes:

(a) The total of usage during the set period (eight hours).

(b) The accumulated total usage stored in the memory to date. The transmission of this information ensures that even if a message is lost so that the total for one of the time periods is not communicated to the central station, the central station can recalculate the amount in the missing time periods from the updated accumulated total.

(c) Some or all of the tamper signals defined above.

(d) The time of transmission.

(e) A message number so that the messages are numbered sequentially. In this way, again the central station can determine whether a message has been lost or whether the information received is merely a duplicate message from a duplicate one of the receiving stations.

(f) "Housekeeping information" concern the status of the remote station, for example the temperature and the battery level indicator sensor values.

In an alternative arrangement the device may be programmed to transmit three different types of messages at different intervals. The first type of message can relate to the accumulated usage information. The second type of message can relate to an alarm condition which is basically transmitted immediately. The alarm conditions that concern might relate to a tamper action or to the absence of electrical voltage indicative of a power failure. The third type of information which may be transmitted less frequently can relate to the housekeeping information defined above.

After preparing the packet of data for transmission, the microprocessor is arranged to hold the data packet for a pseudorandom period of time. This pseudorandom period can be calculated using various randomizing techniques including for example, a psuedo-random sequence followed for example, by an actually pseudorandom calculation based upon the rotation of the metering disk at any particular instant. In this way each of the remote stations is arranged to transmit at a pseudorandom time The microprocessor is also arranged so that the transmission does not occur within a particular predetermined quiet time so that none of the remote stations is allowed to transmit during this quiet time. This quiet time could be set for example, as one hour in every eight hour period. In this way after an eight hour period has elapsed, each of the remote stations would transmit at a pseudorandom time during the subsequent seven hours followed by a quiet one hour.

Network capacity or throughput is limited by the probability of message collisions at each receiving station. Because all remote stations share a single carrier channel and transmit at pseudorandom times, it is possible for several remote stations within range of a particular receiving station to transmit simultaneously and to collide at the receiving station. If the received at signal levels are comparable, the overlaying messages will mutually interfere, causing receive errors and both messages will be lost. However, if one signal is substantially stronger than the other, the stronger signal will be successfully received. Moreover since both signals will be received at at least two and preferably four of the receiving stations, the probability of both messages being received is fairly high unless the remote stations are in close spatial proximity. During an interval T, each transmitter within a cell surrounding a single receiving stations sends a single pseudorandomly timed message of duration M to several potential receive stations.

N = no. of transmitters/cell
M = message duration (seconds)
T = message interval
Pc = probability of collision
Ps = probability of no collision Once any Transmitter, Ti, starts transmitting the propability that another particular transmitter, Tj, will complete or start another transmission is 2M/T.

The propability that there will be no collision is $$1 - \frac{2M}{T}.$$

If there are N − 1 other transmitters the probability of no collision, Ps, is given by $$P_s = \left(1 - \frac{2M}{T}\right)^{N-1}$$

For large N $$P_s = \left(1 - \frac{2M}{T}\right)^{N}$$

For a given Transmitter, Ti, the probability of a collision occurring during the interval T is $$P_c = 1 - P_s = 1 - \left(1 - \frac{2M}{T}\right)^{N}$$

The probability of collisions occurring on n successive tries is $$P_{cn} = (PC)^n$$

For $M = .3$ sec $T = 8$ hrs. $= 28.8 \times 10^3$ secs.

$$P_s = \left(1 - \frac{2M}{T}\right)^{N} \quad (1 - 2.08 \times 10^{-5} = (.999979)^N$$

| N | Ps | Pc1 | Pc2 | Pc3 |
|---|---|---|---|---|
| 100 | .9979 | .0021 | $4 \times 10^{-6}$ | $8 \times 10^{-9}$ |
| 200 | .9958 | .0042 | $1.6 \times 10^{-5}$ | $6.4 \times 10^{-8}$ |
| 500 | .9896 | .0104 | $10^{-4}$ | $10^{-6}$ |
| 1,000 | .9794 | .0206 | $4 \times 10^{-4}$ | $8 \times 10^{-6}$ |
| 2,000 | .9591 | .041 | $1.6 \times 10^{-3}$ | $6.8 \times 10^{-5}$ |
| 5,000 | .9010 | .099 | $9.8 \times 10^{-3}$ | $9.7 \times 10^{-4}$ |
| 10,000 | .811 | .189 | $3.5 \times 10^{-2}$ | $6.7 \times 10^{-3}$ |

From the viewpoint of a receiving station, the number of transmitters, $N_T$, whose signal level exceeds the receiver noise level and an therefore be received reliably depends on (a) the density of transmitters
(b) transmit power level
(c) propagation path loss
(d) background noise.

Propagation path loss is highly variable due to attenuation, reflection refraction and scattering phenomena which are a function of terrain, building structures, and antenna location. Some of these parameters can even vary on a diurnal and seasonal basis.

In estimating network performance however, the simple message collision model is not completely accurate because:

1) pseudorandom noise bursts from various sources can obscure messages which do not collide;

2) some colliding message signals will be of sufficiently different amplitude that the stronger signal will still be received correctly.

A statistical model can be developed to provide data by which determination can be made of the best location and number of receiving stations for a particular geographical location. Thus the model can include data relating to house density, the N— value defined above relating to the attenuation of the signal, the location and presence of large buildings, variations in land height and the presence of trees.

Each receiving station 61, 62, 63, 64 receives, decodes and stores in memory 67 each of these data packets as received from the remote stations. The receiving station comprises simply a suitable resistant casing which can be mounted upon a building, lamp standard or utility pole at a suitable location in the district concerned. The receiving station can be battery powered with a simple omni-directional antenna as an integral part of the housing or supported thereon.

The central station is indicated at 70 and includes a control and analysis section indicated at 71 together with one or more directional antennae 72. During the quiet time, the control unit 71 is arranged to direct the antenna or antennae to each of the receiving stations in turn and to transmit to the respective receiving station a poling signal calling for the receiving station to transmit the stored information from the memory 67. Use of more than one antenna can allow communication with more than one receiving station at a time. The receiving station is required therefore merely to transmit the information upon request in a collated package of the information which is transmitted to the central station and collected for analysis. The transmission between the central station and the receiving stations is carried out in the same carrier frequency or frequencies as the transmission between the remote stations and the receiving stations. The whole system therefore requires only a single dedicated frequency or in the case of the spread spectrum modulation requires only a single modulation code.

When information is received at the central station, the central controller 71 acts to store the information received in the memory and then to analyze the information. The first step in the analysis is to extract from the messages received the identification code relating to the respective remote station following which the information relating to that remote station is introduced into a memory register relating to that emote station to update the information already stored. In the event that the same information is received from a separate one of the receiving stations as a redundant message due to the high levels of duplication of the present system, the central station is arranged to discard such duplicate information either by detection of the message number of simply by causing the information to be introduced into the memory register in a manner which overwrites the information already received without duplication.

One alternative technique for avoiding transmission of duplicate information from the receiving stations to the central station can be used in which each receiving station monitors the transmissions of the other receiving stations. When the signals are monitored, the information transmitted is compared with information stored in any other receiving station doing the monitoring and if any information is found in the memory of the receiving station which is redundant, that information is then cancelled. In this Way when very high levels of redundancy are used, the time for transmission from the receiving station to the central station is not significantly increased.

It is possible also that intermediate stations may be provided between the receiving stations and the central station to provide another level of communication in the hierarchy so this may be necessary in very large networks.

From the individual memory registers right into each remote station, analysis of the usage can be carried out for billing purposes together with analysis of the tampering events if any, the status of the equipment concerned.

In addition to the transmission periodically of the usage data, each remote station can be arranged to transmit an alarm signal upon detection of the removal of the electric voltage. The transmission of the alarm signal can be delayed by a short pseudorandom period of time so that if the loss of the voltage is due to a power outage covering a number of locations all signals are not received at the same time. The receiving stations can also be programmed to retransmit such alarm signals immediately. In this way the central control has immediate information concerning any power outages including the area concerned. This can of course enable more rapid repair functions to be initiated.

Furthermore, the receiving stations can be arranged to transmit control signals for operating equipment within the premises in which the remote station is located. The receiving stations are necessarily arranged in a suitable array to transmit such information so that it is received in each of the premises concerned using again relatively low transmission power and using the equipment provided for the meter reading system. This transmission capability can be used to control, for example, radio controlled switches within the premises of relatively high power equipment for load shedding at peak periods. In similar arrangements (not shown) the remote station may include a receiving facility to enable detection of signals transmitted by the receiving stations. In one example these signals may relate to synchronizing signals so that each of the remote stations is exactly synchronized in time with the central station. This exact synchronization can be used for accurate detection of usage during specific time periods so that the utility may charge different rates for usage during different time periods for the purpose particularly encouraging use at non-peak times again for load shedding purposes.

A remote station simulator device as indicated in FIG. 5 at 75 and is provided for carrying out field trials of the remote stations, receiving stations and central stations prior to implementation of a complete system. The remote station simulator comprises a portable unit having a transmitter having an antenna similar to the antenna of the remote stations. The simulator further includes a control unit arranged to generate messages similar in appearance to the data packets from the remote stations. The control unit is arranged so that it can provide (a) variable message length
(b) variable message formats
(c) variable transmission power level.

The portable unit can therefore be removed from location to location and can be used to transmit simulated messages at different power levels for receipt by different ones of the receiving stations. The system can be used to operate the network for traffic analysis, network installation, field testing and other purposes.

Since various modifications can be made in my invention as hereinabove described, and many apparently widely different embodiments of same made within the spirit on scope of the claims without departing from such spirit and scope, it is intended that all matter contained in the accompanying specification shall be interpreted as illustrative only and not in a limiting sense.

We claim:

1. A radio communication network for communicating information comprising a plurality of remote data generating stations, each of the remote stations having means for generating data for transmission, control means for modulating the data for transmission on a radio frequency carrier and arranged to form said data into a packet of data and to transmit said data at a specific time which is pseudorandomly selected within a predetermined time period, and an antenna for transmitting multi-directionally the carrier, the radio frequency carrier being the same for each of said remote stations, a central station for receiving and storing the data, and a plurality of receiving stations each including means for receiving the data and means for subsequently retransmitting the data to the central station, the receiving stations being arranged in an array relative to the remote stations such that each receiving station can receive data from a plurality of said remote stations and such that the data transmitted by most of said remote stations can be received by at least a respective two of said receiving stations to generate, in the absence of collisions between the transmission of separate ones of said remote station, duplicate packets of the data at lest one of which is redundant, the central station including means for receiving the data from each of said receiving stations, that being provided for identifying and collating the data from each of said remote stations arranged such that only one of the duplicate packets is collated.

2. The invention according to claim 1 wherein the receiving stations are arranged such that the data transmitted by a majority of the remote stations can be received by a respective four of said receiving stations.

3. The invention according to claim 1 wherein said control means of each remote station is arranged to collate data for a specific time period and subsequent to said specific time period at said pseudorandomly selected time is arranged to transmit said collected data in said packed and wherein said control means is arranged to generate for each packet of data related to a plurality of sequential specific time periods a respective one of a plurality of message numbers.

4. The invention according to claim 1 wherein the receiving stations each include means for collating the data received from said remote stations, means for forming the collated data into a packet of data, means for modulating the packet of data for transmission on a radio frequency carrier and an antenna for transmitting the carrier 5. The invention according to claim 4 wherein the receiving stations are arranged such that the carrier is the same for each of the receiving stations and is the same as the carrier of the remote stations and wherein the control means of each of the remote stations is arranged to ensure that the packet of data is transmitted outside a predetermined time slot allocated for transmission from said receiving stations.

6. The invention according to claim 4 in which the central station includes an antenna which is directional and steerable for communicating with each in turn of said receiving stations and wherein each of said receiving stations is arranged to transmit said packet of collated data in response to a polling signal from said central station.

7. The invention according to claim 1 wherein each of said remote stations comprises a support structure for mounting at a remote location, means mounted on the support structure for detecting information to be transmitted and an antenna mounted on said support structure for transmitting multi-directionally such that the carrier transmitted is received by all receiving stations within range of the signal from the antenna.

8. The invention according to claim 7 wherein each of the remote stations is associated with a utility meter for detecting usage of a utility at the location of the remote station.

9. The invention according to claim 8 wherein each remote station includes means for detecting attempts for tampering of the utility meter.

10. The invention according to claim 8 wherein each of the remote stations includes means for calculating and storing a value of accumulated usage of the utility during a predetermined time period and wherein the control means is arranged to generate pseudorandomly said specific time subsequent to the end of said predetermined time period.

11. The invention according to claim 8 wherein each of the remote stations is associated with an electricity meter and wherein each of the remote stations is arranged to transmit an alarm signal on detection of the absence of an electrical voltage at said meter.

12. The invention according to claim 1 wherein the carrier comprises a spread spectrum carrier.

13. The invention according to claim 1 wherein each of the receiving stations includes a multi-directional transmitter and control means responsive to receipt of a signal to transmit a communication signal for receipt by control equipment at the location of said remote stations.

14. The invention according to claim 1 including a remote station simulator device including control means for generating packets of data simulating the data from a remote station and means for transmitting the packets of data at pseudorandom intervals, the control means and the transmitting means being mounted in a portable unit for moving to different locations.

15. The invention according to claim 14 wherein the control means includes means for varying the message length and means for varying the power level of the transmission means.

16. Apparatus for detecting usage of a utility and for transmitting data relating to the usage comprising a support structure for mounting at a location of use of the utility, means on the support structure for detecting use of the utility, means for calculating and storing a usage value of accumulated usage during a predetermined time period, sensor means for detecting presence of an electric field and a magnetic field and generating a sensed value, control means for modulating the usage value and sensed value for transmission on a radio frequency carrier and arranged to form said usage value and sensed value into a packet of data and to transmit said data at a specific time subsequent to said predetermined time period which is substantially pseudorandomly selected and an antenna mounted on said support structure for transmitting multi-directionally the carrier.

17. The invention according to claim 16 wherein the support structure is shaped and arranged for mounting inside a conventional utility meter and wherein the antenna is shaped and arranged so as to be received inside the meter.

18. The invention according to claim 17 wherein detecting means is arranged to detect attempts to tamper with the meter.

19. The invention according to claim 16 wherein the utility is electricity and wherein the detecting means is arranged to generate an alarm signal upon detecting the absence of the electrical voltage.

* * * * *